(12) United States Patent
Altshuller et al.

(10) Patent No.: US 10,776,569 B2
(45) Date of Patent: Sep. 15, 2020

(54) GENERATION OF ANNOTATED COMPUTERIZED VISUALIZATIONS WITH EXPLANATIONS FOR AREAS OF INTEREST

(71) Applicant: International Business Machines Corporation, Armonk, NY (US)

(72) Inventors: Marc S. Altshuller, Toronto (CA); Daniel J. Rope, Reston, VA (US); Jing-Yun Shyr, Naperville, IL (US); Devendra G. Tasgaonkar, Glen Allen, VA (US); Graham J. Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 15/223,103

(22) Filed: Jul. 29, 2016

(65) Prior Publication Data
US 2018/0032492 A1    Feb. 1, 2018

(51) Int. Cl.
*H04N 21/4725* (2011.01)
*H04N 21/4728* (2011.01)
(Continued)

(52) U.S. Cl.
CPC ........ *G06F 40/169* (2020.01); *G06F 16/9024* (2019.01); *G06N 5/045* (2013.01);
(Continued)

(58) Field of Classification Search
CPC ...... G06F 17/241; G06N 5/045; G06N 7/005; G06T 11/206; G06T 11/60
(Continued)

(56) References Cited

U.S. PATENT DOCUMENTS 7,062,410 B2 *   6/2006   Winstead ........... G01R 31/2837
                                                                 702/183
7,657,540 B1 *   2/2010   Bayliss ................. G06F 16/283
                                                                 707/999.1
(Continued)

OTHER PUBLICATIONS

Kandogan, "Just-in-time annotation of clusters, outliers, and trends in point-based data visualizations," Visual Analytics Science and Technology (VAST), 2012 IEEE Conference, pp. 73-82, accessed Jun. 4, 2016.

(Continued)

*Primary Examiner* — Cesar B Paula
*Assistant Examiner* — Luu-Phuong T Nguyen
(74) *Attorney, Agent, or Firm* — Richard Wilhelm; SVL IPLaw

(57) ABSTRACT

A data portion of a data set utilized in a computerized visualization is analyzed to identify one or more areas of interest each including data values representing distinguishable features relative to the data set. An explanation for the data values of each of the one or more areas of interest is determined. Each explanation is based on other data portions of the data set contributing to the distinguishable features. At least one display layer including labels describing the one or more areas of interest is generated. The labels include the explanation for each of the one or more areas of interest. The at least one display layer is disposed over the computerized visualization to produce an annotated visualization with the labels positioned proximate the one or more areas of interest.

22 Claims, 6 Drawing Sheets

(51) Int. Cl.
*G06F 40/169* (2020.01)
*G06T 11/20* (2006.01)
*G06N 5/04* (2006.01)
*G06F 16/901* (2019.01)
*G06F 16/732* (2019.01)
*G06F 16/904* (2019.01)

(52) U.S. Cl.
CPC ........ *G06T 11/206* (2013.01); *G06F 16/7335* (2019.01); *G06F 16/904* (2019.01)

(58) Field of Classification Search
USPC .......................................................... 715/231
See application file for complete search history.

(56) References Cited

U.S. PATENT DOCUMENTS

| | | | |
|---|---|---|---|
| 8,086,462 | B1 | 12/2011 | Alonso et al. |
| 8,417,715 | B1* | 4/2013 | Bruckhaus ............. G06Q 10/04 707/758 |
| 9,244,976 | B1* | 1/2016 | Zhang ................ G06F 16/2453 |
| 9,299,173 | B2 | 3/2016 | Rope et al. |
| 9,311,900 | B2 | 4/2016 | Kandogan |
| 9,536,208 | B1* | 1/2017 | Kakde ..................... G06N 20/00 |
| 2004/0122860 | A1* | 6/2004 | Srinivasan ............. G06Q 10/00 |
| 2005/0153304 | A1* | 7/2005 | Gardner ............... C12Q 1/6897 435/6.16 |
| 2006/0136462 | A1* | 6/2006 | Campos ................. G06F 16/285 |
| 2007/0255512 | A1* | 11/2007 | Delenstarr ............. G06F 19/28 702/35 |
| 2008/0071465 | A1* | 3/2008 | Chapman ........... G01C 21/3691 701/117 |
| 2008/0270088 | A1* | 10/2008 | Abe ....................... G05B 17/02 703/2 |
| 2009/0147011 | A1* | 6/2009 | Buck ..................... G16H 15/00 345/501 |
| 2010/0185984 | A1* | 7/2010 | Wright .................. G06T 11/206 715/833 |
| 2011/0109632 | A1* | 5/2011 | Gorev ................... G06T 11/206 345/440 |
| 2012/0313947 | A1 | 12/2012 | Rope et al. |
| 2012/0313949 | A1 | 12/2012 | Rope et al. |
| 2013/0047113 | A1* | 2/2013 | Hume .................... G06Q 50/22 715/771 |
| 2013/0297767 | A1* | 11/2013 | Kozine ............... G06F 11/3447 709/224 |
| 2014/0071138 | A1 | 3/2014 | Gibson et al. |
| 2014/0198105 | A1 | 7/2014 | Gibson et al. |
| 2015/0015504 | A1* | 1/2015 | Lee ..................... G06F 3/04845 345/173 |
| 2015/0055880 | A1 | 2/2015 | Gibson |
| 2015/0089399 | A1* | 3/2015 | Megill ................ H04L 12/1813 715/753 |
| 2015/0100869 | A1* | 4/2015 | Sunshine ............ G06F 3/04842 715/205 |
| 2015/0220504 | A1* | 8/2015 | Bocanegra Alvarez ..................... G06F 17/241 715/233 |
| 2016/0034561 | A1* | 2/2016 | Sexton .............. G06F 17/30598 707/737 |
| 2016/0147840 | A1* | 5/2016 | Boguraev ............. G06F 3/0484 707/731 |
| 2016/0188598 | A1* | 6/2016 | Moser ................... G06F 3/0482 707/723 |
| 2016/0267397 | A1* | 9/2016 | Carlsson ............. G06N 99/005 |
| 2016/0350294 | A1* | 12/2016 | Nefedov ........... G06F 17/30011 |
| 2017/0017760 | A1* | 1/2017 | Freese .................. G06F 19/328 |
| 2017/0124659 | A1* | 5/2017 | Drennan, III .......... G06Q 40/08 |
| 2017/0177559 | A1* | 6/2017 | Dang ................... G06Q 10/063 |
| 2017/0277727 | A1* | 9/2017 | Chen ..................... G06F 21/56 |
| 2018/0189664 | A1* | 7/2018 | Hegde ................... G06N 5/048 |

OTHER PUBLICATIONS

Hullman et al., "Contextifier: automatic generation of annotated stock visualizations", ACM Conference on Human Factors in Computing Systems (CHI '13), May 2013, 10 pages, accessed Jun. 4, 2016.

Kong et al., "Graphical Overlays: Using Layered Elements to Aid Chart Reading", Visualization and Computer Graphics, IEEE Transactions on 18.12 (2012), pp. 2631-2638, accessed Jun. 4, 2016.

"Decision Trees: An Overview", Aunalytics, http://www.aunalytics.com/decision-trees-an-overview/, retrieved from website Jul. 6, 2016, 9 pages.

* cited by examiner

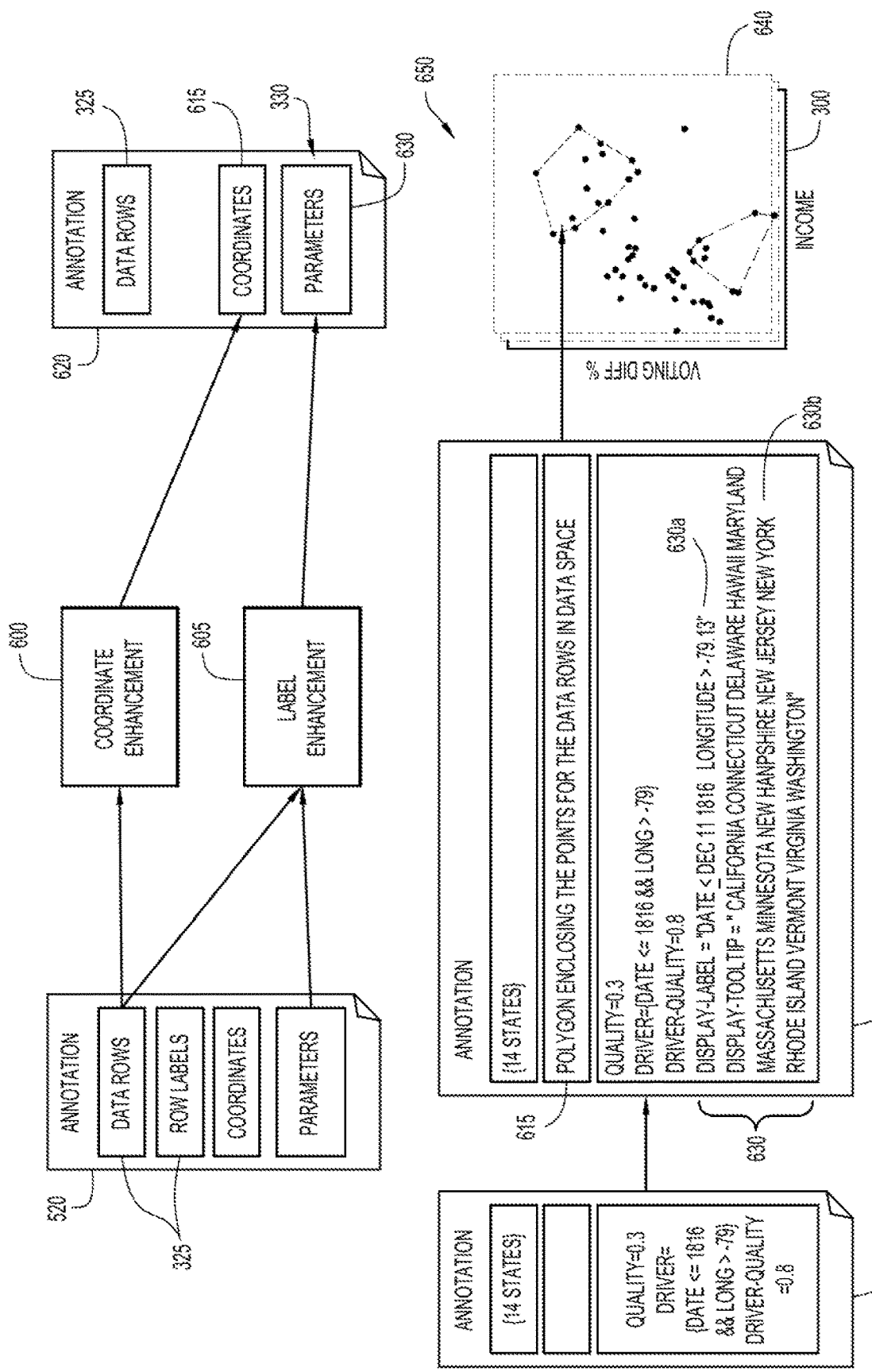

GENERATION OF ANNOTATED COMPUTERIZED VISUALIZATIONS WITH EXPLANATIONS FOR AREAS OF INTEREST

BACKGROUND

1. Technical Field

Present invention embodiments relate to data processing and visualization systems, and more specifically, to generation of a computerized visualization with annotations and explanations automatically derived from an underlying data set for the computerized visualization.

2. Discussion of the Related Art

Deployments of data visualizations are frequently used as a tool to portray a story describing underlying data. Both visuals and dialog are typically used to describe major findings or conclusions. Further, annotations may be manually derived, and manually placed on corresponding data visualizations to draw an observer's attention to an exact conclusion the data visualization is attempting to convey. However, the manual approach may be unable to determine whether a visible pattern is signal or noise, and may completely overlook areas of interest within the underlying data of a data visualization.

Although statistical pattern recognition algorithms can identify patterns of interest within data, these algorithms tend to be available primarily in sophisticated data analysis tools and are typically implemented to begin with data and depict an identified pattern using a standard visualization, thereby utilizing a visualization diverting from the initial visualization actually containing the finding.

In addition, the above approaches may further lack certain desired features. For example, it would be desirable to provide supporting evidence driving a discovered annotation in order to justify that annotation. Moreover, it would be desirable to generalize the detection and annotation placement in order to re-use these items on similar data fields in a different dataset, thereby reducing time and effort by providing a configuration applicable to a plurality of different data sets (e.g., avoiding configuration for each specific data set).

SUMMARY

According to one embodiment of the present invention, a system for annotating computerized visualizations includes at least one processor. The system analyzes a data portion of a data set utilized in a computerized visualization to identify one or more areas of interest each including data values representing distinguishable features relative to the data set. An explanation for the data values of each of the one or more areas of interest is determined. Each explanation is based on other data portions of the data set contributing to the distinguishable features. At least one display layer including labels describing the one or more areas of interest is generated. The labels include the explanation for each of the one or more areas of interest. The at least one display layer is disposed over the computerized visualization to produce an annotated visualization with the labels positioned proximate the one or more areas of interest. Embodiments of the present invention further include a method and computer program product for annotating computerized visualizations in substantially the same manner described above.

Present invention embodiments automatically annotate a data visualization (containing findings), and provide explanations for annotations while remaining agnostic to a specific underlying data set, thereby enabling application to various different data sets.

Present invention embodiments may further include various other aspects. For example, a present invention embodiment may utilize a text pattern associated with an explanation for a corresponding area of interest. The text pattern includes text with one or more parameter identifiers that are replaced with values of corresponding parameters from an annotation associated with the corresponding area of interest to determine the explanation.

Thus, present invention embodiments may provide supporting evidence driving a discovered annotation to justify the annotation to a user.

Moreover, a present invention embodiment may generate annotations, including one or more parameter values, for one or more areas of interest, and filter the one or more areas of interest by applying a filtering rule to the one or more parameter values of the annotations. The filtering rule includes one or more conditions for the one or more parameter values. In addition, the filtering rule and text pattern for the explanation may be re-usable for data sets of other computerized visualizations according to an embodiment of the present invention. This enables detections and annotation placement to be generalized for re-use on similar data fields in a different underlying data set (e.g., customization of the annotations while retaining the ability for the annotations to be re-used), thereby reducing time and effort by providing a configuration applicable to a plurality of different data sets (e.g., avoiding configuration for each specific data set).

BRIEF DESCRIPTION OF THE DRAWINGS

Generally, like reference numerals in the various figures are utilized to designate like components.

FIG. 6 is a diagrammatic illustration of generating and applying display layers with the derived annotations and explanations to the data visualization to produce an annotated data visualization according to an embodiment of the present invention.

DETAILED DESCRIPTION

Figure 1:
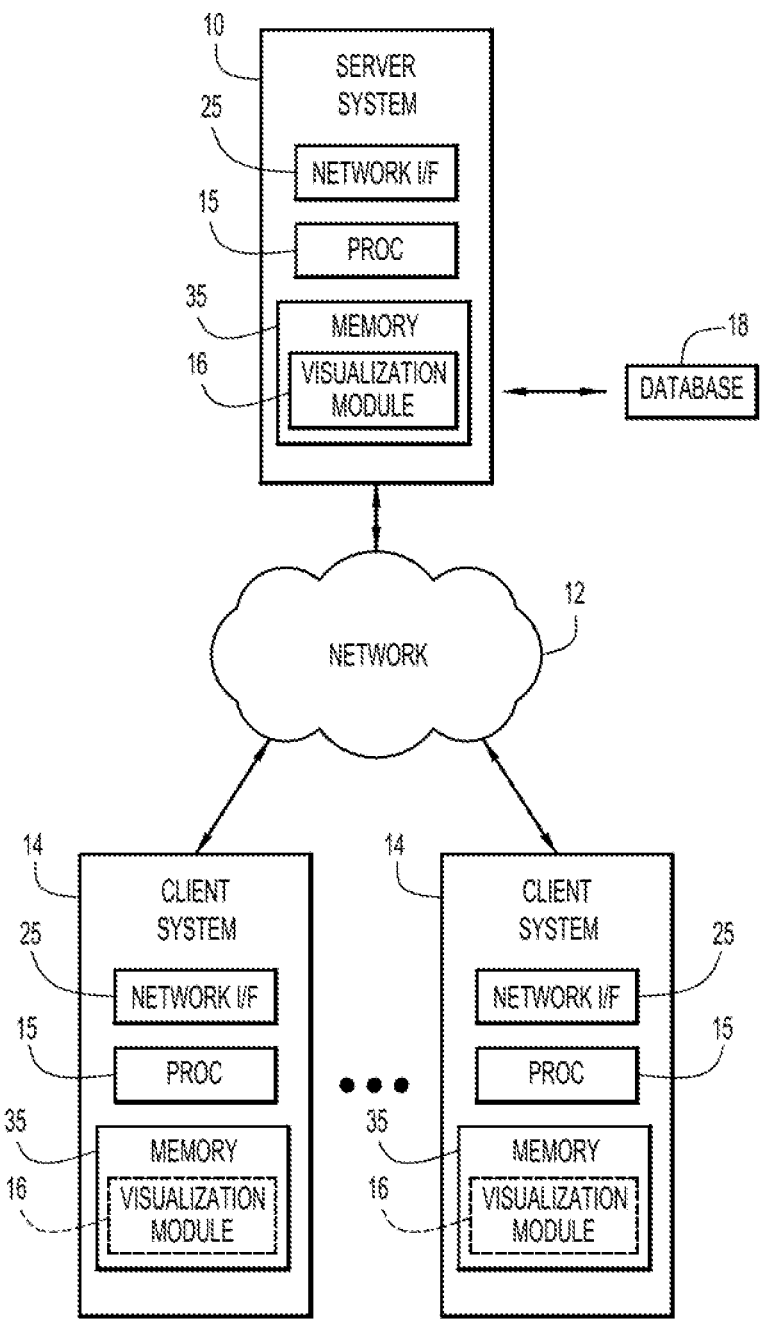
FIG. 1 is a diagrammatic illustration of an example computing environment implementing an embodiment of the present invention.

Annotations for a data visualization may be manually derived, and manually overlaid on a corresponding data visualization to draw an observer's attention to an exact conclusion the data visualization is attempting to convey.

However, the manual approach may be unable to determine whether a visible pattern is signal or noise, and may completely overlook areas of interest within the underlying data of a data visualization.

Although statistical pattern recognition algorithms can identify patterns of interest within data, these algorithms tend to be available primarily in sophisticated data analysis tools and are typically implemented to begin with data and depict an identified pattern using a standard visualization, thereby utilizing a visualization diverting from the initial visualization actually containing the finding.

Present invention embodiments automatically annotate a data visualization (containing findings), and provide explanations for annotations while remaining agnostic to a specific underlying data set, thereby enabling application to various different data sets.

Present invention embodiments may further include various other aspects. For example, a present invention embodiment may utilize a text pattern associated with an explanation for a corresponding area of interest. The text pattern includes text with one or more parameter identifiers that are replaced with values of corresponding parameters from an annotation associated with the corresponding area of interest to determine the explanation. This has the advantage of providing supporting evidence driving a discovered annotation to justify the annotation to a user.

Moreover, a present invention embodiment may further generate annotations, including one or more parameter values, for one or more areas of interest, and filter the one or more areas of interest by applying a filtering rule to the one or more parameter values of the annotations. The filtering rule includes one or more conditions for the one or more parameter values. In addition, the filtering rule and text pattern for the explanation may be re-usable for data sets of other computerized visualizations according to an embodiment of the present invention. This is advantageous and enables detections and annotation placement to be generalized for re-use on similar data fields in a different underlying data set (e.g., customization of the annotations while retaining the ability for the annotations to be re-used), thereby reducing time and effort by providing a configuration applicable to a plurality of different data sets (e.g., avoiding configuration for each specific data set).

A present invention embodiment defines a pipeline to process a computerized data visualization. The pipeline includes initially generating annotations for significant features for a chart (or other data visualization) defined on a corresponding data set. The annotations are filtered according to customizable rules, and augmented with data-driven explanations for the annotations. The annotations are further augmented with customizable display information that allows the annotations to be shown as accompanying text and/or directly on the chart (e.g., generation of one or more visualization layers that are overlaid with the initial data visualization to produce an annotated data visualization).

This pipeline is defined by a specification that is independent of the details of the data set of the chart (or other visualization), and depends only on the type of chart (or, equivalently, on the types of data used in the chart). The specification can be edited (e.g., filtering rules, text patterns, etc.) to customize the annotation, and can be re-applied to data without requiring user intervention.

An example computing environment for use with present invention embodiments is illustrated in FIG. 1. Specifically, the computing environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to submit requests and information (e.g., preferences, data sets, etc.) to server systems 10 to perform analysis and generate annotated visualizations. The client systems may present a graphical user (e.g., GUI, etc.) or other interface (e.g., command line prompts, menu screens, etc.) to solicit information from users pertaining to the desired analysis, and may provide reports including analysis results (e.g., annotated visualizations, evidence supporting analysis results, etc.).

The server systems include a visualization module 16 to perform the requested analysis on a computerized data visualization to identify areas of interest, generate corresponding annotations and explanations, and generate display overlays with the annotations and explanations to produce an annotated visualization as described below. A database system 18 may store various information for the analysis (e.g., data sets, analytics, filtering and/or other rules, text patterns, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, visualization module, browser/interface software, etc.).

Alternatively, one or more client systems 14 may produce annotated visualizations when operating as a stand-alone unit. In a stand-alone mode of operation, the client system stores or has access to the data (e.g., data set, analytics, filtering and/or other rules, text patterns, etc.), and includes visualization module 16 to perform a requested analysis on a data visualization to identify areas of interest, generate corresponding annotations and explanations, and generate display overlays with the annotations and explanations to produce an annotated visualization as described below. The graphical user (e.g., GUI, etc.) or other interface (e.g., command line prompts, menu screens, etc.) solicits information from a corresponding user pertaining to the desired analysis, and may provide reports including analysis results (e.g., annotated visualizations, evidence supporting analysis results, etc.).

Visualization module 16 may include one or more modules or units to perform the various functions of present invention embodiments described below. The various modules (e.g. visualization module, etc.) may be implemented by any combination of any quantity of software and/or hardware modules or units, and may reside within memory 35 of the server and/or client systems for execution by a corresponding processor 15.

Figure 2:
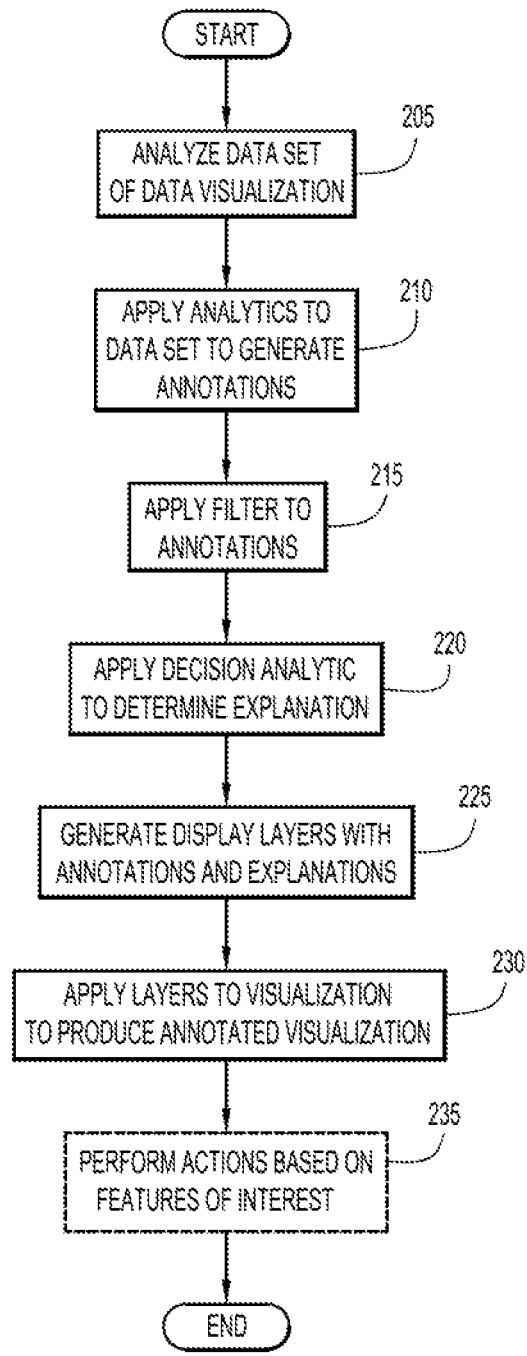
FIG. 2 is a procedural flowchart illustrating a manner of generating an annotated data visualization with explanations according to an embodiment of the present invention.

A manner of generating an annotated data visualization (e.g., via visualization module 16 and at least one server system 10 and/or a client system 14) is illustrated in FIG. 2. Initially, a request to generate an annotated data visualization for a data visualization is received and an underlying data set for the data visualization is analyzed at step 205. The request may include the data and/or visualization, or an indicator or other identifier to specify the desired data visualization for analysis (e.g., visualization identifier, pointer to a location of the data and/or visualization, etc.).

Figure 3:
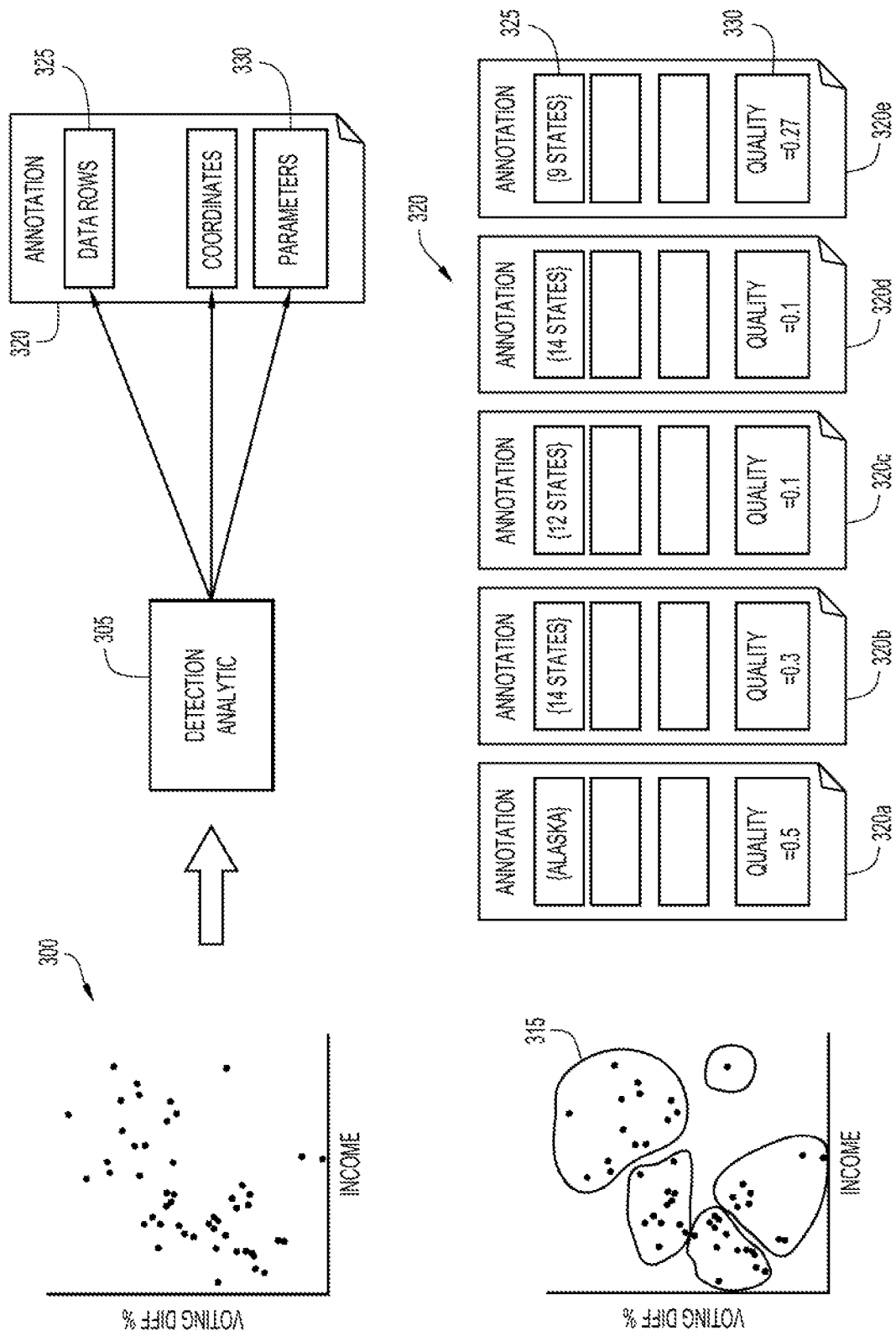
FIG. 3 is a diagrammatic illustration of an example of applying a clustering analytic to an example data set of a data visualization to derive annotations according to an embodiment of the present invention.
Figure 4:
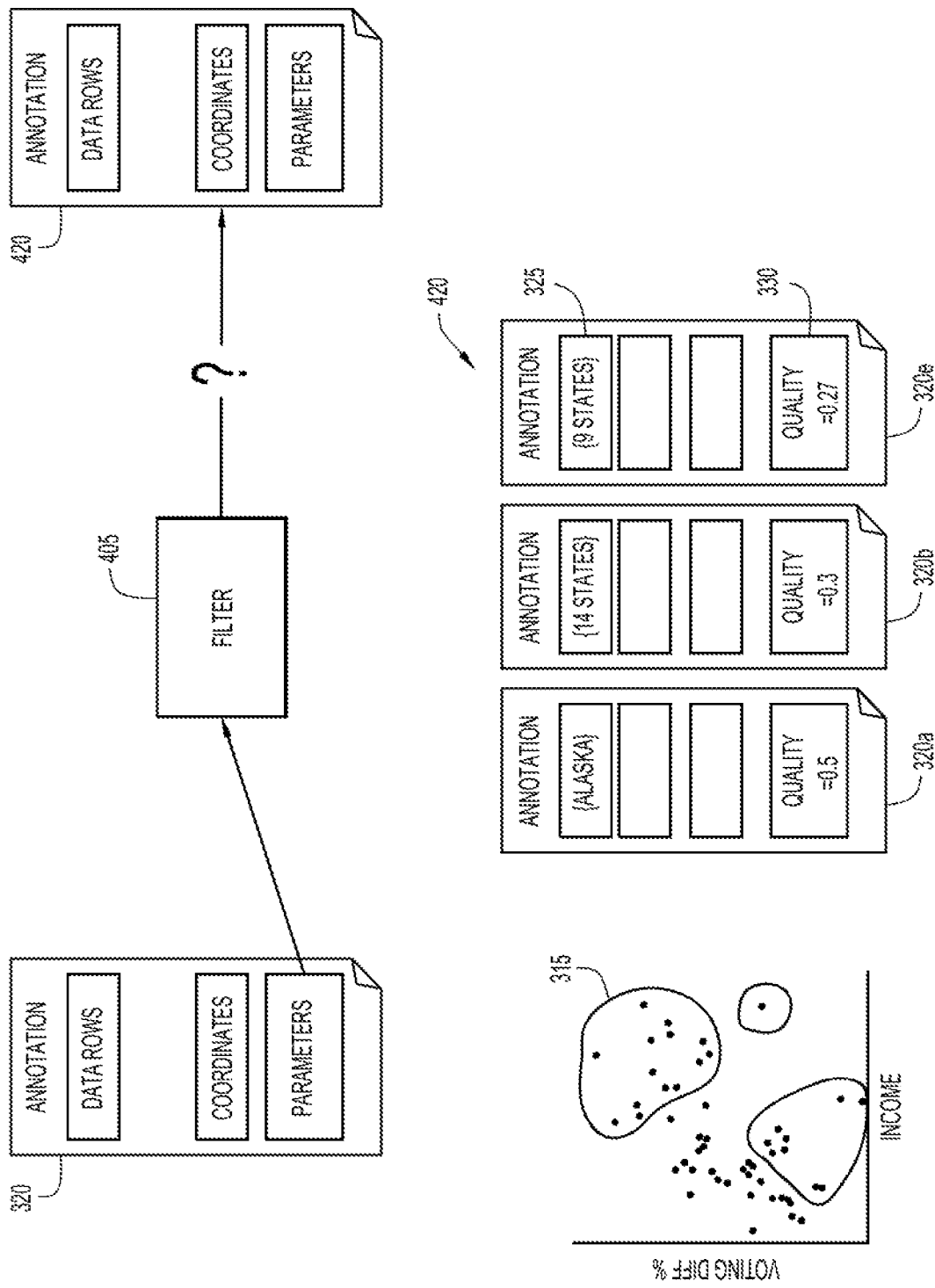
FIG. 4 is a diagrammatic illustration of filtering the annotations derived in the example of FIG. 3 according to an embodiment of the present invention.
Figure 5:
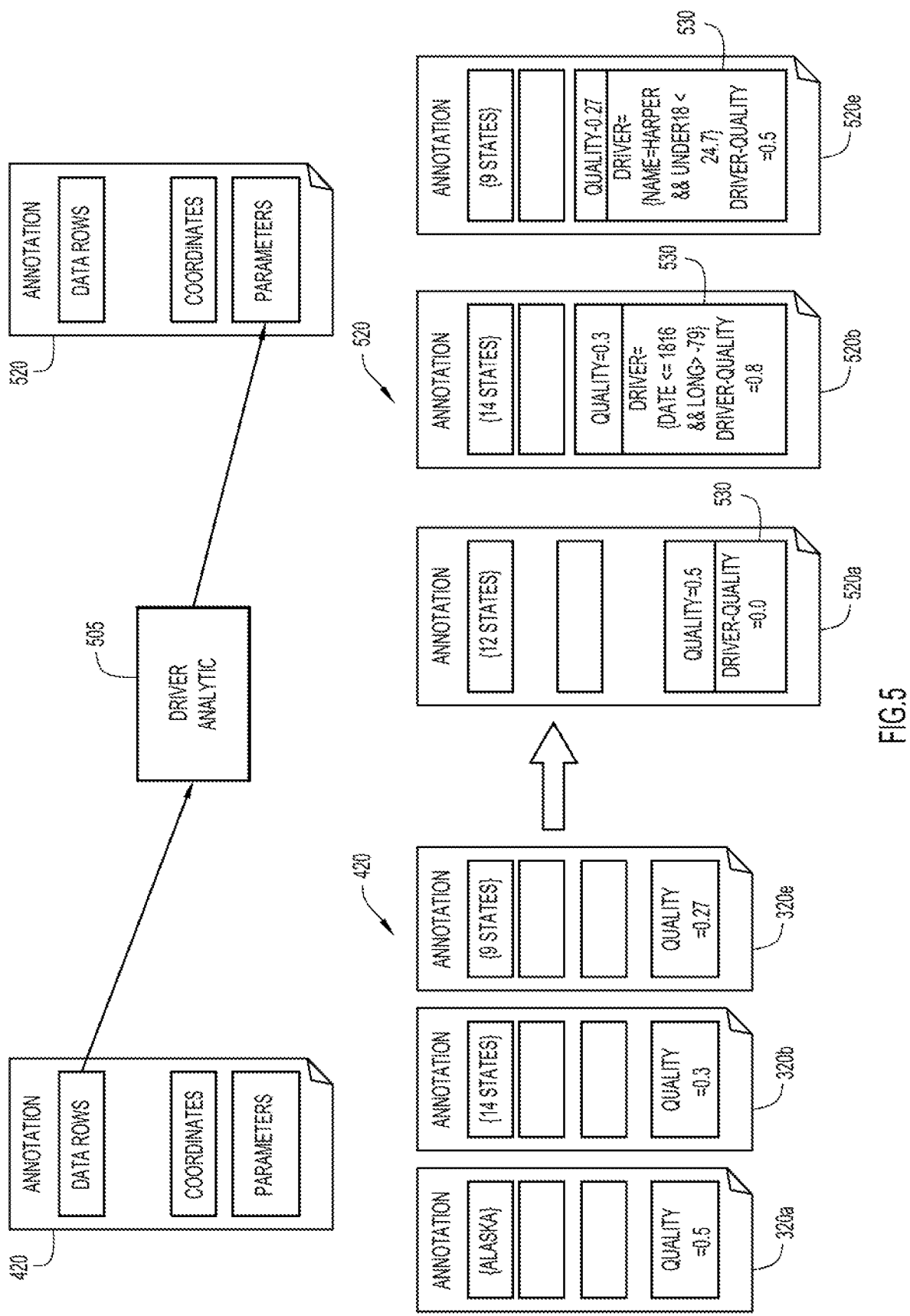
FIG. 5 is a diagrammatic illustration of applying a decision analytic to the filtered annotations of FIG. 4 to derive explanations according to an embodiment of the present invention.

The underlying data set includes a set of data fields each having a known type of data (e.g., nominal or numeric). The underlying data set may be represented as a table with rows and columns providing the information. For example, the underlying data set for scatterplot 300 of FIG. 3 may include a table with a row for each state, and columns with values for income, voting differential percentage, longitudinal location, entry date, axes labels, etc. The analysis of the underlying data set includes assigning each data field (or column) utilized in the data visualization a purpose including: a target (e.g., for a data field (or column) with values associated with a Y dimension (e.g., of a scatterplot or other chart (e.g., voting differential percentage (Voting Diff %) as viewed in scatterplot 300 of FIG. 3), counts within a bar chart, etc.); a predictor (e.g., for a data field (or column) with values associated with an X dimension (e.g., of a scatterplot or other chart (e.g., income as viewed in scatterplot 300 of FIG. 3), etc.); other (e.g., a data field (or column) with information used to stack bars by color in a stacked bar chart, etc.); and label (e.g., a data field (or column) with one or more values used to label data (e.g., axes descriptors of "Voting Diff %" and "Income" of scatterplot 300 of FIG. 3), show helpful suggestions or other information, etc.). However, any suitable purpose or attribute (or indicator of a purpose or attribute) may be assigned to a data field (or column) of the underlying data set. This assignment may be performed in any suitable manner (e.g., rule-based or cognitive systems, previously assigned, pre-existing data or meta-data, field usage in the chart, manual assignment by a user, etc.). The underlying data set may include additional fields (or columns) (not utilized in the data visualization). These additional fields (or columns) may be used to determine explanations based on decision analytics as described below.

Once the data fields (or columns) in the data visualization have been assigned a purpose, a predefined set of detection analytics is applied to values of data points (e.g., target and predictor values) within the data visualization at step 210 to identify distinguishing features (e.g., outliers or other points of interest, etc.) and derive corresponding annotations. Each of the detection analytics may provide varying parameter values (e.g., degree of abnormality, statistical accuracy, etc.) and add to a set of annotations for the data visualization. The parameter values may vary and correspond to a type of data visualization (e.g., scatterplot, bar chart, geographical map, etc.). An annotation includes various information about features of the data visualization and, by way of example, may include: parameters (e.g., a map of parameter names to values, etc.); rows (e.g., an array of identifiers that determine which subsets of the data point values (or rows) of the underlying data set are of interest, etc.); and values (e.g., a set of coordinates in a data (or coordinate) space of the data visualization that represent the features of interest). However, the annotation may include any desired information pertaining to the data visualization.

For example, a regression detection analytic may be performed to produce an annotation for a resulting fit line through the data points of the data visualization. However, the detection analytic may include any conventional or other techniques (e.g., linear or polynomial regression, frequency table analysis (e.g., chi-squared, ANOVA, etc.), time series analysis, geographic/spatial analysis, etc.). The annotation may include information (e.g., parameters, rows, and values as described above) pertaining to: parameters for the goodness of fit, slope, and other statistical measures; and values (or coordinates) providing start and end points for the fit line (in the data visualization).

Annotations may be produced for rows of the underlying data set that contain data point values that are very different (or outliers) representing distinguishable features relative to the data set, where the annotations contain information (e.g., parameters, rows, and values as described above) pertaining to: rows (e.g., including row identifiers) indicating which rows of the underlying data set contain data point values that are unusual; values indicating coordinates of the unusual data points (in the coordinate space of the data visualization), and parameters indicating the degree of abnormality for the indicated rows. The parameters vary and correspond to the detection analytics being employed (e.g., a parameter for a regression detection analytic may provide indications of whether a point is high or low with respect to a fit line, etc.), where the parameters stored in an annotation are preferably dimensionless (e.g., the parameters are not dependent on the data). Thus, an R2 goodness-of-fit statistic is a suitable analytic, whereas a statistical mean of Y dimension values may not be appropriate (since this is tied to the dimension of the specific data of the Y dimension). Any numeric or string value for the information may be utilized; however, utility is improved when the parameters have a known finite domain. The set of pre-defined analytics may be specified in the specification for the pipeline.

The annotations may be filtered at step 215 to validate the annotations (e.g., discern an anomaly or noise from an actual feature, etc.) and identify specific areas of interest. This may be accomplished by applying a pre-defined filter (of one or more rules) to the parameters of each of the annotations. The rules may include any quantity of any suitable conditions or predicates, where any rule-based technique for combining predicates (e.g., boolean, mathematical or other operators, etc.) may be used for filtering rules. The rules may vary based on the type of detection analytics (e.g., a rule requiring large clusters may be employed for clustering analytics, a rule requiring high values may be employed for regression analytics, etc.). Since the pipeline (e.g., feature detection and annotations) may be re-usable, dimensionless parameters of the annotations are preferably used for filtering. For example, rules specifying a particular level of prediction accuracy (e.g., a dimensionless quantity in the range of 0-1, etc.), and/or requiring that regression outliers be positive (e.g., a dimensionless state) may be used for filtering (and re-used for a different data set). In contrast, an example rule requiring that the outlier value be greater than $10,000 is tied to a dimension, and may not be suitable for re-use. The filtering rules may be specified in the specification for the pipeline.

The filtered annotations are processed at step 220 in order to determine an explanation for the filtered annotations (e.g., potential reasons for the data point values being outliers). An annotation suitable for an explanation may receive an identifier during the above processing to designate that annotation as eligible for receiving the explanation. For example, an explanation may be derived for regression outliers, but not for a regression fit line.

A decision analytic is employed to analyze data in the underlying data set other than the data utilized within the visualization (e.g., columns or fields other than ones containing the data point values) to determine factors causing the data variance (or outliers). The decision analytic may employ a predictive model, and may include, by way of example, various conventional analytics, such as decision trees, frequency table analysis, or logistic regression.

For example, a binary variable may be employed as a new field (or column) in the underlying data set table, where a value of '1' indicates that the corresponding row has been identified as an outlier or feature of interest (with a corresponding filtered annotation), and a value of '0' indicates that the corresponding row is not identified as an outlier or feature of interest (and no corresponding filtered annotation exists). A decision tree analytic may be applied to the data fields (or columns) (other than those containing the data point values of the data visualization) to identify data that may be used to predict the binary field (or the designation of an outlier).

Basically, a decision tree analytic constructs a decision tree based on the other data fields (or columns) (e.g., the data fields or columns other than those containing data point values of the data visualization). The decision tree includes a root node representing a total population (e.g., the entire data set of outliers and conforming data), and leaf or target nodes representing the desired output (e.g., the binary field indicating an outlier). The decision tree analytic starts from the root node, and examines each of the other data fields (or columns) in order to partition the total population into smaller groups (e.g., based on values of that data field). The data field that provides the groups with the most similar members (e.g., majority of outliers, etc.) is utilized as a decision point or child node, where a certain value of the data field (or column) used to form the groups is used as a condition for traversing paths extending from the child node. The analysis is repeated for the smaller groups formed by the child node (with the remaining data fields (or columns)) to extend the decision tree with additional nodes until paths through the decision tree terminate at target nodes with groups having all (or virtually all) members as outliers (e.g., a target node associated with a binary field of '1'), or having all (or virtually all) members as conforming data (e.g., target node associated with a binary field of '0'). The decision tree may be tested on a sample of the data set to ensure predictions are accurate. Each path of the resulting decision tree leading to a group of outliers includes the data fields (or columns) (and corresponding values or conditions) that provide the explanation for those outliers. The underlying data set may include, or be expanded to include, any desired data for the decision analytic.

By way of example, a data set may provide information about movies, and include a table with a row for each movie, and ten columns of data pertaining to movies. A scatterplot may graphically illustrate a cost to make each movie versus revenue earned. This data (e.g., cost and revenue earned) may reside in two of the ten columns of the data set table. Most of the movies within the scatterplot follow a curved pattern, but ten movies are identified as outliers or points of interest. A new column of data is constructed within the table having a value of '1' for each movie (or row) that was identified as an outlier, and a value of '0' for the remaining movies (or rows).

A decision tree model is constructed to predict the new column values using the remaining eight columns of data (other than the cost and revenue earned data used for the scatterplot). For example, a data column may include "type of movie", where this column partitions the data set into a first group of "documentary" types with a majority of outliers, and may serve as a first child node from the root node. Another data column of "MPAA Rating" may further partition this first group into a second group of "R" rated movies containing only the outliers, and serve as a second node (a child of the first node) leading to a leaf node associated with the second group containing the outliers. The path of the resulting decision tree indicates that a rule where "type of movie"="documentary" and "MPAA Rating"="R" strongly predicts an outlier or a value of '1' for the new column. The indicated rule may be provided to the user as the explanation for the outliers.

Once the decision tree is constructed and a valid prediction path is identified for an outlier, the corresponding filtered annotation is augmented by adding parameters to the filtered annotation that capture the reason that the outlier values or features of interest are different (e.g., a rule or condition based on the conditions (data fields and corresponding values) within the path). This effectively provides an explanation or description with evidence demonstrating the manner or cause of the variance of the outlier values or features of interest from the data set. Further, another parameter may be added to the annotation that includes a set of identifiers for other rows in the underlying data set that are related to the row associated with the filtered annotation. This enables explanations to show similar items or rows that influence the rows identified in the filtered annotation.

One or more display layers (e.g., display layers 640 of FIG. 6) with information from the filtered annotations (including corresponding explanations) are generated at step 225 to identify and provide information for the corresponding areas of interest within the data visualization. The information within the filtered annotation may be represented in textual form (e.g., as accompanying text adjacent or in proximity of the data visualization, as text placed on the data visualization adjacent or in proximity of the corresponding area of interest, etc.), where a predefined textual pattern is utilized to construct the text. In this case, parameter identifiers in the text pattern are substituted with values of corresponding parameters from the filtered annotation. The text patterns are preferably directed to aspects of the data itself in order to be used across different visualizations and data sets. For example, a regression textual pattern may include.

"This line shows a {{direction}} slope and is significant at the {{accuracy}} level", where {direction} and {accuracy} are replaced by the values of the corresponding parameters in the associated filtered annotation. Text for a label (e.g., identifying areas of interest and/or providing the explanation), and/or helpful tool suggestions may be constructed in substantially the same manner (e.g., a text pattern with identifiers for the label and suggestions). The text patterns may be selected and associated with an annotation or explanation based on various criteria (e.g., type of analytic, type of data, etc.). In addition, the text patterns may be specified in the specification for a pipeline.

When information from the filtered annotation is to be displayed on the data visualization, the values present in the filtered annotation (e.g., representing coordinates of the features of interest in the coordinate space of the data visualization) are used to determine coordinates (e.g., indicating a polygonal or other shaped region in the coordinate space of a display layer corresponding to the data visualization) for placement of the information on the data visualization. If the values (indicating coordinates) are not present within the filtered annotation, row identifiers within the filtered annotation are used to find the corresponding rows, and extract coordinates from those rows (e.g., the target and predictor values for the data points of the data visualization). Filtered annotations lacking values (or coordinates) and row identifiers are typically not presented within the data visualization.

In addition, a secondary visualization may be displayed that shows the information from the rows specified by the filtered annotation (e.g., and from any annotation explanation-generated related rows) as compared to the overall data set. For example, when a filtered annotation identifies a given baseball player as unusual (or an outlier), and further identified several related players with similar statistics (e.g., related rows produced during generation of the explanation), a parallel coordinates display may be shown as a secondary visualization highlighting those related players.

The resulting coordinates and text are combined to create various labeled shapes which are generated on one or more display layers. The display layers are overlaid with the data visualization at step 230 to produce an annotated visualization (with the desired areas of interest identified with the corresponding labels (e.g., including any explanations)) (e.g., annotated visualization 650 with display layers 640 of FIG. 6).

The analysis may enable generation of various actions at step 235 (e.g., to control other devices based on detection of outliers, etc.). For example, outliers or features of interest may be detected within financial data (e.g., stock prices, etc.), where the explanations may provide conditions for triggering notifications, or to electronically perform transactions (e.g., buy, sell, etc.). Alternatively, the data visualization may provide operating characteristics or attributes for a machine (e.g., thermal unit, computer system, manufacturing system, medical device, alarm system, etc.). Outliers or features of interest within the operating characteristics may be determined (e.g., indicating reduced performance or erroneous operation, etc.), and explanations for the outliers may be determined and used to adjust controls, configuration and/or operation of the machine (e.g., adjust temperature/mode of the thermal unit, etc.).

For a given data visualization, multiple pipelines (e.g., feature detection and annotations) may be applied, each resulting in zero or more annotations. Each annotation is defined by the set of detection analytics, filter criteria or rules, and label/explanation text patterns as described above. The filtering rules and label text patterns are configurable (or editable) (e.g., within a pipeline specification), and may be used to customize when to show annotations and the corresponding text.

An example of annotating a data visualization according to an embodiment of the present invention to produce an annotated data visualization is illustrated in FIGS. 3-6. By way of example, the data visualization includes a scatterplot and the detection analytic includes a clustering analytic. However, a present invention embodiment may annotate any desired data visualization and employ and desired analytics.

Initially, a scatterplot 300 (FIG. 3) includes a series of data points each representing a geographic state with an X-axis providing median income and a Y-axis providing a voting differential percentage between candidates of political parties for that state. An underlying data set may be represented as a table with rows for the states and columns for the above and other information (e.g., income, voting differential percentage, entry dates, popular names, percentage of state population under 18 years of age, etc.). A clustering analytic 305 is applied to the data points of the data visualization to generate a corresponding set of annotations 320 as described above (e.g., for step 210 of FIG. 2). In this example, the clustering analytic identifies five potential clusters or areas of interest 315 each including one or more data points (or states), and creates a corresponding annotation 320a, 320b, 320c, 320d, and 320e in annotation set 320 for each cluster. Each annotation includes data rows (or row identifiers) 325 associated with the data points (or states) of the corresponding cluster (e.g., state of ALASKA corresponding to the data point in the cluster corresponding to annotation 320a, a listing of 14 states/rows for the data points in each of the clusters corresponding to annotations 320b and 320d, a listing of 12 states/rows for the data points in the cluster corresponding to annotation 320c, and a listing of 9 states/rows for the data points in the cluster corresponding to annotation 320e), and a parameter 330 providing a measure of cluster quality (e.g., 0.5 for annotation 320a, 0.3 for annotation 320b, 0.1 for annotations 320c and 320d, and 0.27 for annotation 320e).

A filter 405 (FIG. 4) may be applied to annotation set 320 to produce a set of filtered annotations 420 (and corresponding filtered clusters 315) as described above (e.g., for step 215 of FIG. 2). By way of example, a filtering rule specifies that clusters with a minimum level of quality (e.g., cluster quality measure >0.2) are retained in annotation set 420. In this case, annotations 320a (e.g., with a cluster quality measure of 0.5), 320b (e.g., with a cluster quality measure of 0.3), and 320e (e.g., with a cluster quality measure of 0.27) are placed in annotation set 420 since the corresponding cluster quality values satisfy the filtering rule (e.g., cluster quality measure >0.2).

A driver analytic 505 (FIG. 5) is performed for each cluster 315 corresponding to a member of the set of filtered annotations 420 (e.g., annotations 320a, 320b, and 320e) as described above (e.g., for step 220 of FIG. 2) to determine an explanation or reason for the outlier or feature of interest. By way of example, the driver analytic may construct and employ decision trees, where paths within the decision tree may provide the conditions (or explanation) for the outliers or features of interest based on other data (e.g., data other than the data used for the data points of the scatterplot) of the underlying data set as described above. For example, these conditions (or other data) may relate to entry dates, longitudinal position, state names, popular male names, and/or amount of population under 18 years of age (e.g., as illustrated in FIG. 6).

Each annotation 320a, 320b, and 320e within the set of filtered annotations 420 is augmented with additional text parameters 530 providing an explanation for (or describing) the manner in which the corresponding cluster significantly differs (or is an outlier) from the rest of the data to form a set of annotations 520. Annotation set 520 includes resulting augmented annotations 520a, 520b, and 520e respectively corresponding to annotations 320a, 320b, and 320e of the filtered set of annotations 420. By way of example, the augmented text parameters may indicate entry dates, longitudinal position, state names, popular male names, and/or amount of a population under 18 years of age.

Data rows 325 of the annotations within annotation set 520 are used by a coordinate enhancement analytic 600 (FIG. 6) to create coordinate values 615 within a resulting set of annotations 620 as described above. These coordinates are used to create a polygonal or other shaped region (e.g., in the coordinate space of a display layer corresponding to the scatterplot) for display on scatterplot 300. Label enhancement or builder 605 uses text patterns to construct labels (e.g., including explanations, etc.) and helpful suggestions 630 within parameters 330 of annotations within the resulting set of annotations 620 as described above.

For example, annotation 520b may be processed by coordinate enhancement analytic 600 to produce coordinates 615 of resulting annotation 620b (of the set of annotations 620) defining a polygon (or other shaped area) enclosing data points for corresponding data rows 325 of annotation 520b in the data (or coordinate) space (e.g., of a display layer corresponding to the scatterplot). Label builder 605 may be applied to the data rows and parameters of annotation 520b to produce a label parameter 630a and a suggestion parameter 630b in resulting annotation 620b. Label parameter 630a indicates an entry date (e.g., entry date for a state on or prior to Dec. 11, 1816) and location (e.g., Longitude>–79.13), while suggestion parameter 630b indicates a list of the corresponding 14 states/rows associated with the data rows identified by annotation 520b (e.g., and residing in resulting annotation 620b).

One or more display layers 640 are generated as described above (e.g., for step 225 of FIG. 2) with these label and/or suggestion parameters of annotation 620b (e.g., positioned within the area defined by the corresponding coordinates 615), where display layers 640 are overlaid as described above (e.g., for step 230 of FIG. 2) with scatterplot 300 to produce a corresponding annotated scatterplot 650. The annotated scatterplot includes text identifying, and located in a proximity of, clusters associated with the augmented annotations of the resulting set of annotations 620 and providing corresponding explanations (e.g., entry date and longitudinal position (e.g., Date≤Dec. 11 1816 ●Longitude>–79.13), state name (e.g., ALASKA), popular name and age population (e.g., Harper●Under_18≤24.7)).

It will be appreciated that the embodiments described above and illustrated in the drawings represent only a few of the many ways of implementing embodiments for generation of annotated computerized visualizations with explanations.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, visualization module, etc.). These systems may include any types of monitors and input devices (e.g., keyboard, mouse, voice recognition, etc.) to enter and/or view information.

It is to be understood that the software (e.g. visualization module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., visualization module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data sets, analytics, filtering and/or other rules, text patterns, etc.). The database system may be implemented by any number of any conventional or other databases, data stores or storage structures (e.g., files, databases, data structures, data or other repositories, etc.) to store information (e.g., data sets, analytics, filtering and/or other rules, text patterns, etc.). The database system may be included within or coupled to the server and/or client systems. The database systems and/or storage structures may be remote from or local to the computer or other processing systems, and may store any desired data (e.g., data sets, analytics, filtering and/or other rules, text patterns, etc.).

The present invention embodiments may employ any number of any type of user interface (e.g., Graphical User Interface (GUI), command-line, prompt, etc.) for obtaining or providing information (e.g., annotated visualizations, evidence supporting analysis results, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., annotated visualizations, evidence supporting analysis results, etc.).

The present invention embodiments are not limited to the specific tasks or algorithms described above, but may be utilized for any visualizations (e.g., computerized, for digital, electronic, or other display, etc.) and underlying data sets. The visualizations may include any desired form (e.g., graph, chart, plot, geographic or other map, etc.). The data set may include any quantity of any types of data for the visualization, and any related data that may or may not be used in the visualization. The data set may be represented or contained in any desired structure (e.g., table, objects, array, etc.). The visualization may employ any desired coordinate space (e.g., Cartesian, Polar, etc.) and any quantity of dimensions (or axes). The underlying data set may be assigned any attributes (with respect to the visualization) in any desired fashion (e.g., rule-based or cognitive systems, previously assigned, pre-existing data or meta-data, field usage in the chart, manual assignment by a user, etc.).

The annotations may include any quantity of any desired information (e.g., rows, parameters, text, symbols, coordinates, etc.). The explanations may include any desired format and content (e.g., text, symbols, characters, etc.). The text patterns may include any format, and any quantity of identifiers to indicate the type and placement of information within the pattern.

Any statistical or other technique may be utilized to identify areas of interest (e.g., containing outliers, features of interest, etc.) within a data visualization (e.g., linear or polynomial regression, frequency table analysis (e.g., chi-squared, ANOVA, etc.), time series analysis, geographic/spatial analysis, etc.), and generate any desired corresponding measures and/or parameters (e.g., quality, accuracy, etc.). The analytics may each generate any quantity of annotations/explanations which may be provided on the data visualization (e.g., different annotations may be generated for the different analytics and provided on the data visualization, etc.). An area of interest may include any quantity of annotations provided on the data visualization based on the same or different analytics.

The filtering may apply any type of filtering (e.g., rule-based, etc.) to validate and/or identify specific areas of interest. The filtering rules may be applied to any information within an annotation or data visualization. The filtering rules may include any quantity of any suitable conditions or predicates, where any rule-based technique for combining predicates (e.g., boolean, mathematical or other operators, etc.) may be used for filtering rules. The filtering may be optional, where all (or any portion of the) identified areas of interest and corresponding annotations may be processed.

The explanations may be determined from any predictive or other model correlating data that may affect data values of the areas of interest (e.g., decision trees, frequency table analysis, logistic regression, etc.). The explanation may include any information to describe the reasons or cause for the data values of the areas of interest in any manner (e.g., conditions and/or values from the predictive model based on the data or related data, statistical correlation or other measures, etc.). The explanations may be based on any text or other patterns of any desired format.

The display layers may be of any quantity, stacked or arranged in any fashion, and disposed over the data visualization in any manner to produce an annotated visualization. The layers preferably include a same coordinate space as the data visualization, but may include any desired coordinate space which may be the same or different than the coordinate space of the data visualization. Any suitable conversion techniques may be employed to correlate the coordinate spaces of the display layer with the data visualization. The display layers may include any quantity of annotations/explanations that may be overlaid with each other and/or the data visualization. The display layers may be sequentially disposed over the data visualization to display the annotations/explanations in a temporal or serial manner.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of annotating computerized visualizations comprising:
    analyzing a data portion of a data set utilized in a computerized visualization to identify one or more areas of interest each including outliers of the data portion with data values representing distinguishable features relative to the data set, wherein the data set includes a table with a row for each data item and a plurality of columns providing data fields for each row, and wherein at least two of the columns are utilized as axes to produce the computerized visualization in a form of a graphical plot of data from the at least two columns;
    generating an annotation for each area of interest, wherein each annotation comprises a plurality of parameter values including one or more row identifiers indicating associated rows of the table containing a data item in the area of interest, and wherein at least one annotation further includes one or more related row identifiers indicating other rows of the table containing a data item not in the area of interest and having data related to the associated rows;

determining an explanation for the data values of the outliers of each of the one or more areas of interest based on a corresponding annotation, wherein each explanation indicates one or more factors causing the distinguishable features for the outliers of an associated area of interest, and the one or more factors are each data from other columns of the table of the data set, wherein the other columns of the table of the data set contribute to the distinguishable features and are excluded from utilization as the axes and plotted data in the computerized visualization;

generating at least one display layer including labels describing the one or more areas of interest, wherein the labels include the explanation for each of the one or more areas of interest;

disposing the at least one display layer over the computerized visualization to produce an annotated visualization with the labels positioned proximate the one or more areas of interest; and generating a secondary computerized visualization for the other rows of the at least one annotation using the at least two columns as axes.

2. The method of claim 1, wherein analyzing a data portion includes:
applying a statistical analytic to the data portion to identify the one or more areas of interest.

3. The method of claim 1, wherein the parameter values of each annotation further include a value lacking dimensions to utilize the annotation across different data sets, and wherein the method further comprises:
filtering the one or more areas of interest by applying a filtering rule to the plurality of parameter values of each annotation, wherein the filtering rule includes one or more conditions for the plurality of parameter values.

4. The method of claim 3, wherein a text pattern is associated with an explanation for a corresponding area of interest and includes text with one or more parameter identifiers, and determining an explanation for the data values includes:
replacing the one or more parameter identifiers in the text with values of corresponding parameters from an annotation associated with the corresponding area of interest.

5. The method of claim 4, wherein the filtering rule and text pattern are re-usable for data sets of other computerized visualizations.

6. The method of claim 1, wherein determining an explanation for the data values includes:
generating a predictive model for predicting the data values of a corresponding area of interest, wherein the predictive model indicates conditions for the other columns of the table of the data set contributing to the data values of the corresponding area of interest; and
determining the explanation for the corresponding area of interest from the conditions within the predictive model.

7. The method of claim 6, wherein the predictive model includes a decision tree to predict the data values of the corresponding areas of interest from the other columns of the table of the data set, wherein the decision tree includes a root node representing an entire population of the data set, target nodes indicating presence of an outlier, and decision points between the root node and target nodes partitioning the population based on values of the other columns of the table, and wherein paths of the decision tree through the decision points to the target nodes indicate the other columns of the table providing the explanation.

8. The method of claim 1, wherein generating at least one display layer includes:
generating at least one display layer including a corresponding shaped area for each area of interest enclosing the outliers for that area of interest, wherein coordinates for generating the corresponding shaped area are derived from coordinates of the outliers for that area of interest, and wherein the labels are positioned proximate the corresponding shaped area for the one or more areas of interest.

9. A system for annotating computerized visualizations comprising:
at least one processor configured to:
analyze a data portion of a data set utilized in a computerized visualization to identify one or more areas of interest each including outliers of the data portion with data values representing distinguishable features relative to the data set, wherein the data set includes a table with a row for each data item and a plurality of columns providing data fields for each row, and wherein at least two of the columns are utilized as axes to produce the computerized visualization in a form of a graphical plot of data from the at least two columns;

generate an annotation for each area of interest, wherein each annotation comprises a plurality of parameter values including one or more row identifiers indicating associated rows of the table containing a data item in the area of interest, and wherein at least one annotation further includes one or more related row identifiers indicating other rows of the table containing a data item not in the area of interest and having data related to the associated rows;

determine an explanation for the data values of the outliers of each of the one or more areas of interest based on a corresponding annotation, wherein each explanation indicates one or more factors causing the distinguishable features for the outliers of an associated area of interest, and the one or more factors are each data from other columns of the table of the data set, wherein the other columns of the table of the data set contribute to the distinguishable features and are excluded from utilization as the axes and plotted data in the computerized visualization;

generate at least one display layer including labels describing the one or more areas of interest, wherein the labels include the explanation for each of the one or more areas of interest;

dispose the at least one display layer over the computerized visualization to produce an annotated visualization with the labels positioned proximate the one or more areas of interest; and generate a secondary computerized visualization for the other rows of the at least one annotation using the at least two columns as axes.

10. The system of claim 9, wherein analyzing a data portion includes:
applying a statistical analytic to the data portion to identify the one or more areas of interest.

11. The system of claim 9, wherein the parameter values of each annotation include a value lacking dimensions to utilize the annotation across different data sets, and wherein the at least one processor is further configured to:

filter the one or more areas of interest by applying a filtering rule to the plurality of parameter values of each annotation, wherein the filtering rule includes one or more conditions for the plurality of parameter values.

12. The system of claim 11, wherein a text pattern is associated with an explanation for a corresponding area of interest and includes text with one or more parameter identifiers, and determining an explanation for the data values includes:

replacing the one or more parameter identifiers in the text with values of corresponding parameters from an annotation associated with the corresponding area of interest.

13. The system of claim 12, wherein the filtering rule and text pattern are re-usable for data sets of other computerized visualizations.

14. The system of claim 9, wherein determining an explanation for the data values includes:

generating a predictive model for predicting the data values of a corresponding area of interest, wherein the predictive model indicates conditions for the other columns of the table of the data set contributing to the data values of the corresponding area of interest; and determining the explanation for the corresponding area of interest from the conditions within the predictive model.

15. The system of claim 14, wherein the predictive model includes a decision tree to predict the data values of the corresponding areas of interest from the other columns of the table of the data set, wherein the decision tree includes a root node representing an entire population of the data set, target nodes indicating presence of an outlier, and decision points between the root node and target nodes partitioning the population based on values of the other columns of the table, and wherein paths of the decision tree through the decision points to the target nodes indicate the other columns of the table providing the explanation.

16. A computer program product for annotating a computerized visualization, the computer program product comprising one or more non-transitory computer readable storage media collectively having computer readable program code embodied therewith, the computer readable program code executable by at least one processor to cause the at least one processor to:

analyze a data portion of a data set utilized in a computerized visualization to identify one or more areas of interest each including outliers of the data portion with data values representing distinguishable features relative to the data set, wherein the data set includes a table with a row for each data item and a plurality of columns providing data fields for each row, and wherein at least two of the columns are utilized as axes to produce the computerized visualization in a form of a graphical plot of data from the at least two columns;

generate an annotation for each area of interest, wherein each annotation comprises a plurality of parameter values including one or more row identifiers indicating associated rows of the table containing a data item in the area of interest, and wherein at least one annotation further includes one or more related row identifiers indicating other rows of the table containing a data item not in the area of interest and having data related to the associated rows;

determine an explanation for the data values of the outliers of each of the one or more areas of interest based on a corresponding annotation, wherein each explanation indicates one or more factors causing the distinguishable features for the outliers of an associated area of interest, and the one or more factors are each data from other columns of the table of the data set, wherein the other columns of the table of the data set contribute to the distinguishable features and are excluded from utilization as the axes and plotted data in the computerized visualization;

generate at least one display layer including labels describing the one or more areas of interest, wherein the labels include the explanation for each of the one or more areas of interest;

dispose the at least one display layer over the computerized visualization to produce an annotated visualization with the labels positioned proximate the one or more areas of interest; and generate a secondary computerized visualization for the other rows of the at least one annotation using the at least two columns as axes.

17. The computer program product of claim 16, wherein analyzing a data portion includes:

applying a statistical analytic to the data portion to identify the one or more areas of interest.

18. The computer program product of claim 16, wherein the parameter values of each annotation include a value lacking dimensions to utilize the annotation across different data sets, and wherein the computer readable program code is configured to further cause the at least one processor to:

filter the one or more areas of interest by applying a filtering rule to the plurality of parameter values of each annotation, wherein the filtering rule includes one or more conditions for the plurality of parameter values.

19. The computer program product of claim 18, wherein a text pattern is associated with an explanation for a corresponding area of interest and includes text with one or more parameter identifiers, and determining an explanation for the data values includes:

replacing the one or more parameter identifiers in the text with values of corresponding parameters from an annotation associated with the corresponding area of interest.

20. The computer program product of claim 19, wherein the filtering rule and text pattern are re-usable for data sets of other computerized visualizations.

21. The computer program product of claim 16, wherein determining an explanation for the data values includes:

generating a predictive model for predicting the data values of a corresponding area of interest, wherein the predictive model indicates conditions for the other columns of the data set contributing to the data values of the corresponding area of interest; and determining the explanation for the corresponding area of interest from the conditions within the predictive model.

22. The computer program product of claim 21, wherein the predictive model includes a decision tree to predict the data values of the corresponding areas of interest from the other columns of the table of the data set, wherein the decision tree includes a root node representing an entire population of the data set, target nodes indicating presence of an outlier, and decision points between the root node and target nodes partitioning the population based on values of the other columns of the table, and wherein paths of the decision tree through the decision points to the target nodes indicate the other columns of the table providing the explanation.

* * * * *